(12) United States Patent
Munier et al.

(10) Patent No.: US 10,523,394 B2
(45) Date of Patent: Dec. 31, 2019

(54) TTI SWITCHING FOR MULTICARRIER HSUPA

(71) Applicant: Telefonaktiebolaget LM Ericsson (publ), Stockholm (SE)

(72) Inventors: Florent Munier, Västra Frölunda (SE); Gerardo Medina Acosta, Märsta (SE); Waikwok Kwong, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 70 days.

(21) Appl. No.: 15/542,724

(22) PCT Filed: May 10, 2017

(86) PCT No.: PCT/SE2017/050471
§ 371 (c)(1),
(2) Date: Jul. 11, 2017

(87) PCT Pub. No.: WO2017/196242
PCT Pub. Date: Nov. 16, 2017

(65) Prior Publication Data
US 2018/0212735 A1    Jul. 26, 2018

Related U.S. Application Data

(60) Provisional application No. 62/336,268, filed on May 13, 2016.

(51) Int. Cl.
*H04W 4/00*    (2018.01)
*H04L 5/00*    (2006.01)
(Continued)

(52) U.S. Cl.
CPC ......... *H04L 5/0053* (2013.01); *H04W 72/042* (2013.01); *H04W 76/25* (2018.02);
(Continued)

(58) Field of Classification Search
None
See application file for complete search history.

(56) References Cited

U.S. PATENT DOCUMENTS

2011/0170420 A1    7/2011  Xi et al.
2013/0114525 A1*   5/2013  Ahmadi ............... H04L 5/0053
                                                    370/329
(Continued)

OTHER PUBLICATIONS

Author Unknown, "Technical Specification Group Radio Access Network; Multiplexing and channel coding (FDD) (Release 14)," Technical Specification 25.212, Version 14.0.0, 3GPP Organizational Partners, Dec. 2016, 168 pages.
(Continued)

*Primary Examiner* — Zewdu A Beyen
(74) *Attorney, Agent, or Firm* — Withrow & Terranova, PLLC

(57) ABSTRACT

It is presented a method for control of Transmission Time Interval (TTI) combinations in multicarrier High Speed Uplink Packet Access (HSUPA). The method is performed in a serving node of a communication network and comprises sending a single High Speed Signalling Control Channel (HS-SCCH) order for TTI switching of a primary Uplink (UL) frequency and for TTI switching of a secondary uplink frequency to a user equipment. It is also presented a serving node, a user equipment, a computer program and a computer program product thereof.

18 Claims, 4 Drawing Sheets

(51) Int. Cl.
    *H04W 76/25*     (2018.01)
    *H04W 72/04*     (2009.01)
    *H04W 76/15*     (2018.01)

(52) U.S. Cl.
    CPC .... *H04W 72/0413* (2013.01); *H04W 72/0453* (2013.01); *H04W 76/15* (2018.02)

(56) References Cited

U.S. PATENT DOCUMENTS

| | | | |
|---|---|---|---|
| 2014/0056372 A1* | 2/2014 | Nammi | H04L 1/0029 375/260 |
| 2015/0043442 A1 | 2/2015 | Wong et al. | |
| 2016/0029388 A1 | 1/2016 | Ali et al. | |

OTHER PUBLICATIONS

Huawei et al., "RP-152227: New Study Item proposal: Study on Multi-Carrier enhancements for UMTS" 3rd Generation Partnership Project (3GPP), TSG RAN Meeting #70, Dec. 7-10, 2015, 6 pages, Sitges, Spain.

Nokia Siemens Networks et al., "RP-090014: Dual-Cell HSUPA," 3rd Generation Partnership Project (3GPP), TSG-RAN Meeting #43, Mar. 3-6, 2009, 6 pages, Biarritz, France.

Huawei, et al., "R3-160690: Overview of Multi-Carrier enhancements," 3rd Generation Partnership Project (3GPP), TSG RAN Meeting #91bis, Apr. 11-15, 2016, 3 pages, Bangalore, India.

International Search Report and Written Opinion for International Patent Application No. PCT/SE2017/050471, dated Aug. 18, 2017, 13 pages.

International Preliminary Report on Patentability (Chapter II) for International Patent Application No. PCT/SE2017/050471, dated Apr. 10, 2018, 7 pages.

Author Unknown, "Technical Specification Group Radio Access Network; Multiplexing and channel coding (FDD) (Release 13)," Technical Specification 25.212, Version 13.0.0, 3GPP Organizational Partners, Sep. 2015, 169 pages.

Huawei et al., "R1-144414: Clarification of HS-SCCH orders for Rel-12 features," Change Request 25.214, 3GPP TSG-RAN1 Meeting #78bis, Oct. 6-10, 2014, Ljubljana, Slovenia, 5 pages.

Huawei et al., "R2-162380: Discussion on TTI configuration in MC enhancements," 3GPP TSG-RAN WG2 Meeting #93bis, Apr. 11-15, 2016, Dubrovnik, Croatia, 5 pages.

Search Report for for Japanese Patent Application No. 2018-559817, dated Sep. 18, 2019, 20 pages.

Notice of Reasons for Rejection for Japanese Patent Application No. 2018-559817, dated Oct. 1, 2019, 10 pages.

* cited by examiner

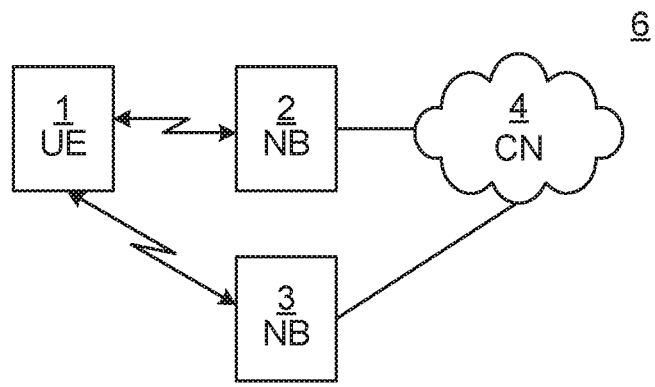
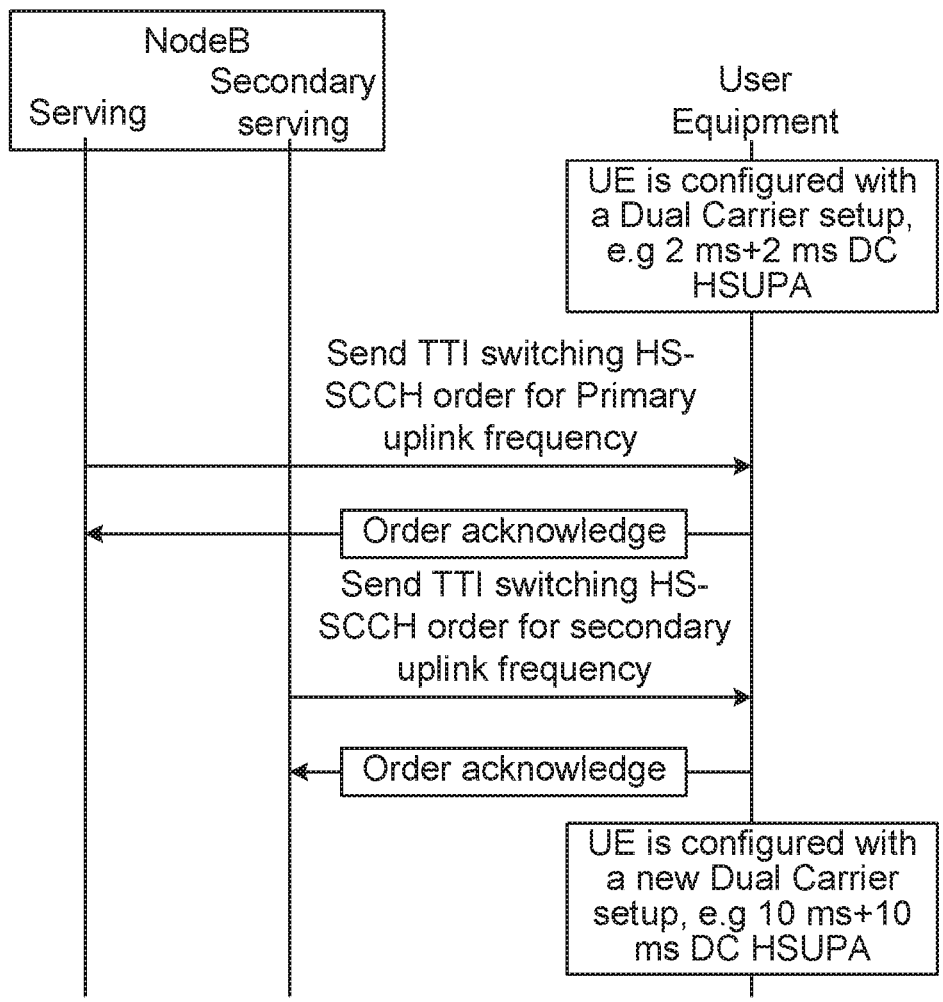
Fig. 1
Fig. 2

TTI SWITCHING FOR MULTICARRIER HSUPA

This application is a 35 U.S.C. § 371 national phase filing of International Application No. PCT/SE2017/050471, filed May 10, 2017, which claims benefit of U.S. Provisional No. 62/336,268, filed May 13, 2016, the disclosures of which are incorporated herein by reference in their entireties.

TECHNICAL FIELD

The invention relates to a method for control of transmission time interval combinations in a multicarrier high speed uplink packet access, and a serving node, a user equipment, a computer program and a computer program product thereof.

BACKGROUND

In the 3GPP Radio Access Network (RAN) plenary meeting #70, a new study item entitled "Multi carrier enhancements for UMTS" was approved, RP-152227, Study on Multi-Carrier enhancements for UMTS, Huawei, HiSilicon, China Unicom, RAN #70, Sitges, Spain, 2015. As of today, the Universal Mobile Telecommunications System, UMTS, standard only allows for Dual Band—Dual Carrier High Speed Uplink Packet Access (DB-DC-HSUPA) or DC-HSUPA with 2 ms Transmission Time Interval (TTI) on both carriers. In the new study item it was proposed to extend the capability of multicarrier HSUPA by allowing 10 ms TTI to be configured for one or two carriers.

DC-HSUPA was introduced in Release 9 of 3GPP TS 25.212, RP-090014, Study Item "RANimp-DC_HSUPA", 2009. During Release 13 DB-DC-HSUPA was introduced to add dual band support. In Release 14, the Study Item Description (SID) in the new study states that "10 ms TTI can be configured for multi-carrier deployments. In this way 10 ms TTI can be configured on one carrier or two carriers when DB-DC-HSUPA/DC-HSUPA is configured to obtain higher data rates."

Based on the SID, a number of possible configurations were foreseen, from which the following scenarios were identified as the most promising ones:

Scenario 1: 2 ms+10 ms configuration for DB-DC-HSUPA scenario

Scenario 2: 10 ms+10 ms configuration for DB-DC-HSUPA scenario

Scenario 3: 10 ms+10 ms configuration for DC-HSUPA scenario

The scenarios have been subject to evaluations, and their potential gains have been compared to legacy performance accounting for both the fixed 2 ms TTI configuration used for both uplink carriers irrespective of DB-DC-HSUPA or DC-HSUPA, and the single carrier performance suitable when the losses between the Network and mobile unit become large because of distance between these entities.

In relation with the possible TTI configurations that can be used by UMTS, enhanced Uplink (EUL) has had the possibility to switch fast between TTI lengths since Release 12. This enhancement allows fast reconfiguration of the User equipment (UE) via a specific set of High-Speed Shared Control Channel, HS-SCCH, orders. Now that the Multi-carrier scenarios in the UMTS may potentially deal with independent TTI configurations per carrier, it becomes relevant to revise this mechanism in order to provide a proper handling in both DC-HSUPA and DB-DC-HSUPA scenarios.

SUMMARY

It is an object of the invention to enable improved system performance for the Universal Mobile Telecommunications System.

According to a first aspect, a method for control of transmission time interval (TTI) combinations in multicarrier High Speed Uplink Packet Access (HSUPA) is presented. The method is performed in a serving node of a communication network and comprises sending a single High Speed Signalling Control Channel (HS-SCCH) order for TTI switching of a primary uplink (UL) frequency and for TTI switching of a secondary uplink frequency to a User Equipment (UE).

The communication network may be a Universal Mobile Telecommunications System (UMTS).

The HS-SCCH order may be sent under the extended order type "11 011".

The HS-SCCH order may be sent indicating a TTI switch order to 2 ms+10 ms, to 10 ms+2 ms, to 2×2 ms (i.e., 2 ms+2 ms), or to 2×10 ms (i.e., 10 ms+10 ms).

For example, the HS-SCCH order may be sent indicating a TTI switch order from 2×2 ms to 2×10 ms, from 2×10 ms to 2×2 ms, from 2×2 ms to 10 ms+2 ms, from 10 ms+2 ms to 2×2 ms, from 2×10 ms to 10 ms+2 ms, from 10 ms+2 ms to 2×10 ms, from 2×2 ms to 2 ms+10 ms, from 2 ms+10 ms to 2×2 ms, from 2 ms+10 ms to 2×10 ms, or from 2×10 ms to 2 ms+10 ms.

The coverage of the communication network may be extended by switching to a longer TTI.

The throughput of the communication network may be increased by switching to a shorter TTI.

According to a second aspect, a method for control of transmission time interval (TTI) combinations in multicarrier High Speed Uplink Packet Access (HSUPA) is presented. The method is performed in a User Equipment of a communication network and comprises receiving a single High Speed Signalling Control Channel (HS-SCCH) order for TTI switching of a primary uplink frequency and for TTI switching of a secondary uplink frequency from a serving node.

The communication network may be a UMTS-compliant communication network.

The HS-SCCH order may be received from a HS-DSCH node.

The HS-SCCH order may be received under the extended order type "11 011".

The HS-SCCH order may be received indicating a TTI switch order to 2 ms+10 ms, to 10 ms+2 ms, to 2×2 ms, or to 2×10 ms.

The HS-SCCH order may be received indicating a TTI switch order from 2×2 ms to 2×10 ms, from 2×10 ms to 2×2 ms, from 2×2 ms to 10 ms+2 ms, from 10 ms+2 ms to 2×2 ms, from 2×10 ms to 10 ms+2 ms, from 10 ms+2 ms to 2×10 ms, from 2×2 ms to 2 ms+10 ms, from 2 ms+10 ms to 2×2 ms, from 2 ms+10 ms to 2×10 ms, or from 2×10 ms to 2 ms+10 ms.

The coverage of UMTS may be extended by switching to a longer TTI.

The throughput of the UMTS may be increased by switching to a shorter TTI.

According to a third aspect, a serving node for control of transmission time interval (TTI) combinations in multicarrier High Speed Uplink Packet Access (HSUPA) is presented. The serving node comprises a processor and a computer program product. The computer program product stores instructions that, when executed by the processor, causes the network node to send a single High Speed Signalling Control Channel (HS-SCCH) order for TTI switching of a primary uplink (UL) frequency and for TTI switching of a secondary uplink frequency to a User Equipment (UE 1).

According to a fourth aspect, a User Equipment (UE) for control of transmission time interval (TTI) combinations in multicarrier High Speed Uplink Packet Access (HSUPA) is presented. The UE comprises a processor and a computer program product. The computer program product stores instructions that, when executed by the processor, causes the network node to receive a single High Speed Signalling Control Channel (HS-SCCH) order for TTI switching of a primary uplink frequency and for TTI switching of a secondary uplink frequency from a serving node.

According to a fifth aspect, a serving node for control of transmission time interval (TTI) combinations in multicarrier High Speed Uplink Packet Access (HSUPA) is presented. The serving node comprises a communication manager for sending a single High Speed Signalling Control Channel (HS-SCCH) order for TTI switching of a primary uplink (UL) frequency and for TTI switching of a secondary uplink frequency to a User Equipment (UE).

According to a sixth aspect, a User Equipment (UE) for control of transmission time interval (TTI) combinations in multicarrier High Speed Uplink Packet Access (HSUPA) is presented. The UE comprises a communication manager for receiving a single High Speed Signalling Control Channel (HS-SCCH) order for TTI switching of a primary uplink frequency and for TTI switching of a secondary uplink frequency from a serving node.

According to a seventh aspect, a computer program for control of transmission time interval (TTI) combinations in multicarrier High Speed Uplink Packet Access (HSUPA) is presented. The computer program comprises computer program code which, when run on a serving node, causes the serving node to send a single High Speed Signalling Control Channel (HS-SCCH) order for TTI switching of a primary uplink (UL) frequency and for TTI switching of a secondary uplink frequency to a User Equipment (UE).

According to an eighth aspect, a computer program for control of transmission time interval (TTI) combinations in multicarrier High Speed Uplink Packet Access (HSUPA) is presented. The computer program comprises computer program code which, when run on the UE, causes the UE to receive a single High Speed Signalling Control Channel (HS-SCCH) order for TTI switching of a primary uplink frequency and for TTI switching of a secondary uplink frequency from a serving node.

A computer program product comprising a computer program and a computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, on which:

FIG. 1 is a schematic diagram illustrating an environment where embodiments presented herein can be applied;

FIG. 2 is a schematic signalling scheme for an embodiment presented herein;

DETAILED DESCRIPTION

Figure 3:
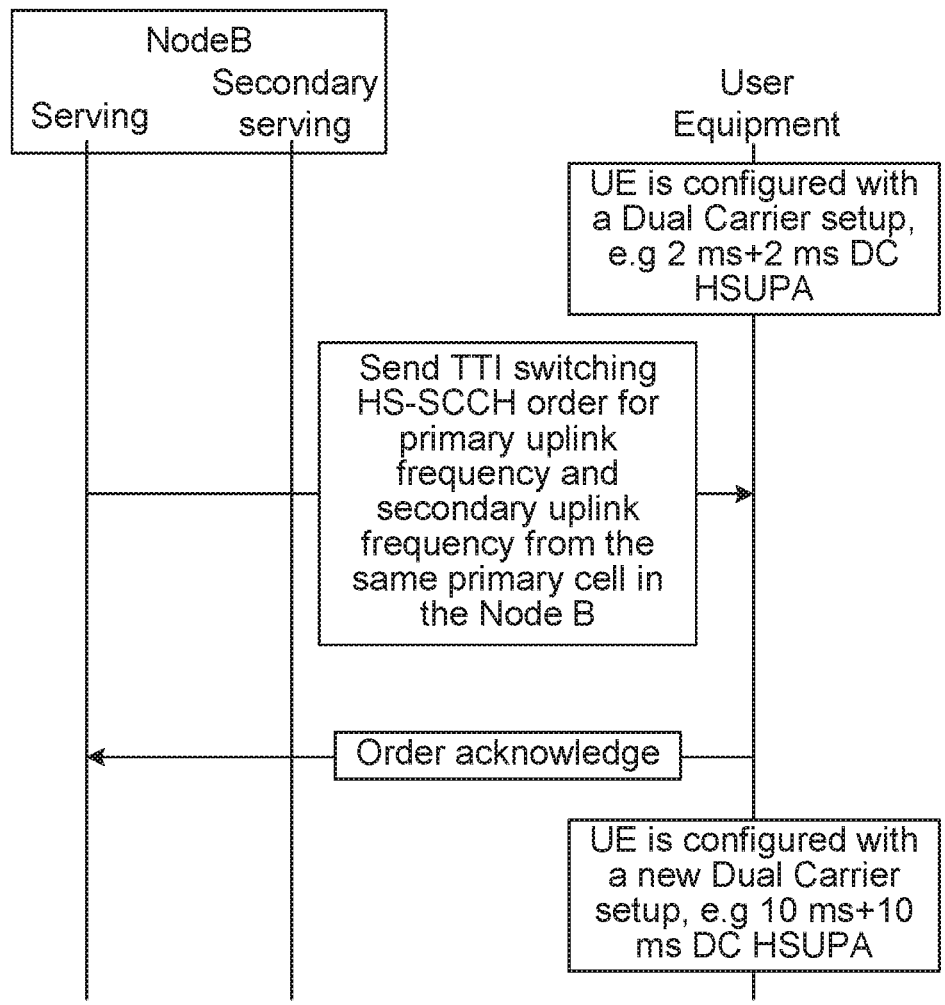
FIG. 3 is a schematic signalling scheme for an embodiment presented herein.
Figure 4A:
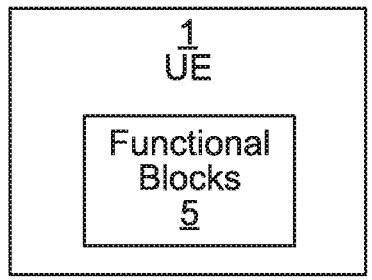
FIGS. 4A-4C are schematic diagrams illustrating implementations of embodiments herein.
Figure 4B:
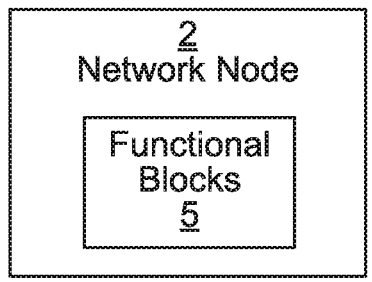
Figure 4C:
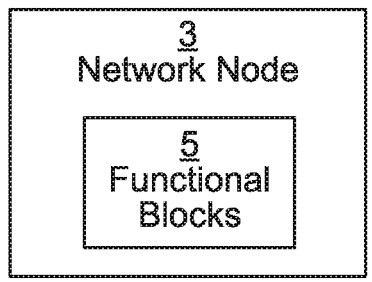

The invention will now be described more fully hereinafter with reference to the accompanying drawings, on which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In DB-DC-HSUPA, and DC-HSUPA, it has been proposed to allow using 2 ms as well as 10 ms TTI configuration for performing transmissions of the data. Moreover, different combinations of 2 ms and 10 ms TTI configurations on the uplink carriers have been proposed. This leads to the following possible transmission cases:

Case 1 (baseline): 2 ms TTI primary uplink frequency+2 ms TTI secondary uplink frequency Case 2: 10 ms TTI primary uplink frequency+2 ms TTI secondary uplink frequency Case 3: 2 ms TTI primary uplink frequency+10 ms TTI secondary uplink frequency Case 4: 10 ms TTI primary uplink frequency+10 ms TTI secondary uplink frequency The uplink (UL) and downlink (DL) carriers are paired in DB-DC-HSUPA. In the UL the terminology is primary uplink frequency and secondary uplink frequency. In the DL the terminology is serving HS-DSCH cell and secondary serving HS-DSCH cell. In the following the terms serving HS-DSCH cell and secondary serving HS-DSCH cell will be exchanged to serving HS-DSCH node and secondary serving HS-DSCH node, respectively. A HS-DSCH node is thus a node of a HS-DSCH cell.

Given the variety of TTI configurations that can be used by the network it would be beneficial for the system's performance to have a TTI switching mechanism per carrier, e.g. a mechanism allowing a change of TTI length on one carrier independently of other carriers, that can be used for providing more control to the network on when to switch a configuration for exploiting in a more dynamic way the characteristics of the different TTI lengths as a function of its associated carrier, e.g. including band characteristics. This is due to the fact that it has been demonstrated that using different TTI lengths indifferent parts of the cell have different benefits, either in rate or in coverage. Switching between a rate-focused TTI length, i.e. 2 ms TTI, or a coverage-focused TTI length, i.e. 10 ms TTI, can be beneficial to be performed independently per carrier at different time instants or cell locations.

According to an embodiment the existing TTI switching mechanism is changed to cover more than a single carrier scenario, aiming at preparing the system to deal with the variety of TTI configurations that may be introduced for multicarrier scenarios in the UMTS.

The multicarrier solution provides more control to the network on when to switch a TTI configuration for more dynamically exploiting the characteristics of the different TTI lengths configured per carrier, e.g. including band characteristics. Some examples of the advantages that can be obtained by using TTI switching in multicarrier scenarios are the following ones:

- The coverage can be extended if a carrier that was initially configured with 2 ms TTI is switched to 10 ms TTI when the User Equipment, UE, is getting far away from the network (e.g. moves away from the nearest access node of the network).
- A higher total throughput can be achieved by performing a TTI switch if a carrier that was initially configured with 10 ms is switched to 2 ms TTI when the UE is getting closer to the network.
- The solution offers the versatility of exploiting further the additional throughput and coverage gains that can be obtained by switching on-demand the TTI configurations associated to carriers that belong to different bands.
- The usage of HS-SCCH orders, either new combinations or a different interpretation of the existing ones, for performing a TTI switching in multicarrier scenarios offers a faster alternative compared to performing a Radio Resource Control, RRC, reconfiguration for achieving the same purpose.

3GPP TS 25.212 Release 12 has provisions for TTI switching for a given cell, if the order is transmitted from the serving High Speed Downlink Shared Channel, HS-DSCH, cell or a secondary serving HS-DSCH cell. The order is encoded under the extended order type "11 011". The orders for switching TTI on a given carrier according to the current specification are listed in Table 1 below.

A way to interpret the TTI switching mechanism in uplink multicarrier scenarios is presented, wherein the cell transmitting HS-SCCH in the downlink would be sending an order for the duplex cell in the uplink i.e. the serving cell HS-SCCH order will apply to the primary uplink frequency and the secondary serving cell HS-SCCH order will apply to the secondary uplink frequency. It is thus possible to switch TTIs independently for each carrier.

It is possible to reuse the legacy orders reconfiguring primary and secondary TTI lengths independently. In this case, the HS-SCCH order transmitted from either the serving or secondary HS-DSCH cells would be respectively controlling which carrier in uplink, i.e. either the primary or secondary uplink frequency, would be changing its TTI configuration.

The use of a HS-SCCH order for TTI switching of multicarrier HSUPA is not explicitly stated in the specification and this may be updated in a future release.

TABLE 1

Orders for switching Enhanced Dedicated Channel (E-DCH) TTI on a given carrier, 3GPP Release 12 and higher

| Extended Order Type $X_{eodt,1}, X_{eodt,2}$ | Order Type $X_{odt,1}, X_{odt,2}, X_{odt,3}$ | Order Mapping $X_{ord,1}$ $X_{ord,2}$ $X_{ord,3}$ | | | Interpretation |
|---|---|---|---|---|---|
| 11 | 011 | 0 | 0 | 0 | TTI switch order from 2 ms to 10 ms |
| | | 0 | 0 | 1 | TTI switch order from 10 ms to 2 ms |
| | | 0 | 1 | 0 | Unused (Reserved) |
| | | 0 | 1 | 1 | Unused (Reserved) |
| | | 1 | 0 | 0 | Unused (Reserved) |
| | | 1 | 0 | 1 | Unused (Reserved) |
| | | 1 | 1 | 0 | Unused (Reserved) |
| | | 1 | 1 | 1 | Unused (Reserved) |

Introduction of new orders to switch to a specific TTI combination for both carriers is presented. As Table 1 shows, six reserved slots remain unused for that order type which may be used to assign TTI combinations for multicarrier scenarios.

A design example is presented providing a single order reconfiguring for both primary and secondary TTI lengths at once. Available HS-SCCH orders (i.e., unused/reserved bit combinations in Order Mapping) may be used, as shown in Table 2.

TABLE 2

Orders for switching the E-DCH TTI for multiple carriers

| Extended Order Type $X_{eodt,1}, X_{eodt,2}$ | Order Type $X_{odt,1}, X_{odt,2}, X_{odt,3}$ | Order Mapping $X_{ord,1}$ $X_{ord,2}$ $X_{ord,3}$ | | | Interpretation |
|---|---|---|---|---|---|
| 11 | 011 | 0 | 0 | 0 | TTI switch order from 2 ms to 10 ms |
| | | 0 | 0 | 1 | TTI switch order from 10 ms to 2 ms |
| | | 0 | 1 | 0 | TTI switch order from 2 × 2 ms to 2 × 10 ms |
| | | 0 | 1 | 1 | TTI switch order from 2 × 10 ms to 2 × 2 ms |
| | | 1 | 0 | 0 | TTI switch order from 2 × 2 ms to 10 ms + 2 ms |
| | | 1 | 0 | 1 | TTI switch order from 10 ms + 2 ms to 2 × 2 ms |
| | | 1 | 1 | 0 | TTI switch order from 2 × 10 ms to 10 ms + 2 ms |
| | | 1 | 1 | 1 | TTI switch order from 10 ms + 2 ms to 2 × 10 ms |

The new HS-SCCH orders added to Table 2 account for the TTI configurations that are foreseen to be the most relevant scenarios, but some other cases may be included or may replace the examples given in Table 2. For example:

2×2 ms to 2 ms+10 ms
2 ms+10 ms to 2×2 ms
2 ms+10 ms to 2×10 ms
2×10 ms to 2 ms+10 ms

The solutions presented above are specific to the different cases of DC-DB-HSUPA/DC-HSPA and address the specific issue of being able to handle multiple TTI combination possible by switching between the different combinations on demand. Independently of TTI lengths being used on the primary and secondary carriers prior to the reception of an HS-SCCH order used to indicate a TTI switching, the final states (i.e., the new TTI lengths) can only be 2 ms+10 ms, 10 ms+2 ms, 2×2 ms, or 2×10 ms.

An alternative set of new HS-SCCH orders to switch to a specific TTI combination for both carriers is presented in Table 3. The orders in Table 3 specify the final states (i.e., the new TTI lengths). They may be independent of the initial state.

TABLE 3

Orders for switching the E-DCH TTI for multiple carriers

| Extended Order Type $X_{eodt,1}, X_{eodt,2}$ | Order Type $X_{odt,1}, X_{odt,2}$ | $X_{odt,3}$ | Order Mapping $X_{ord,1}$ | $X_{ord,2}$ | $X_{ord,3}$ | Interpretation |
|---|---|---|---|---|---|---|
| 11 | 011 | 0 | 0 | 0 | Unused (Reserved) |
|  |  | 0 | 0 | 1 | Unused (Reserved) |
|  |  | 0 | 1 | 0 | TTI switch order to 2 ms + 10 ms |
|  |  | 0 | 1 | 1 | TTI switch order to 10 ms + 2 ms |
|  |  | 1 | 0 | 0 | TTI switch order to 2 × 2 ms |
|  |  | 1 | 0 | 1 | TTI switch order to 2 × 10 ms |
|  |  | 1 | 1 | 0 | Unused (Reserved) |
|  |  | 1 | 1 | 1 | Unused (Reserved) |

A UMTS communication network 6 wherein the embodiments described herein can be implemented is presented in FIG. 1. A UE 1 is wirelessly connectable to two NodeBs 2 and 3. The NodeBs 2 and 3 are connected to a core network (CN) 4. One of the Node B is a serving Node B and one is a non-serving Node B.

An embodiment will now be presented with reference to FIG. 2. The UE is configured with a dual carrier setup, e.g. 2 ms+2 ms DC-HSUPA. In this case, the serving Node B contains a serving node and a secondary serving node. From the serving node the serving NodeB sends a TTI switching HS-SCCH order for the primary uplink frequency. The UE sends an order acknowledgement, and has thus been reconfigured for the primary uplink frequency. From the secondary serving node, the serving NodeB sends a TTI switching HS-SCCH order for the secondary uplink frequency. The UE sends an order acknowledgement, and has thus been reconfigured for the secondary uplink frequency. The UE is now reconfigured with a new dual carrier setup, e.g. 10 ms+10 ms DC-HSUPA.

An embodiment will now be presented with reference to FIG. 3. The UE is configured with a dual carrier setup, e.g. 2 ms+2 ms DC-HSUPA. From the serving node, the serving NodeB sends a single TTI switching HS-SCCH order applying to both the primary uplink frequency and the secondary uplink frequency. The UE sends an order acknowledgement, and has thus been reconfigured for the primary uplink frequency and for the secondary uplink frequency. The UE is now reconfigured with a new dual carrier setup, e.g. 10 ms+10 ms DC-HSUPA.

A method for control of TTI combinations in HSUPA is presented. The method is performed in a serving node 2, 3 of a communication network 6. The method comprises sending 60 a single HS-SCCH order for TTI switching of a primary uplink frequency and for TTI switching of a secondary uplink frequency to a UE 1.

A switching order in the form of a particular HS-SCCH order may be sent from the serving HS-DSCH node to indicate to the UE to switch the TTI of the primary UL carrier and another switching order may be sent using the HS-SCCH order from the secondary serving HS-DSCH node to indicate a TTI switch for the secondary UL carrier, wherein the HS-SCCH order transmissions may or may not be performed at the same time.

A method for control of TTI combinations in HSUPA is presented. The method is performed in a communication network 6 and comprises sending 61 a first HS-SCCH order for TTI switching of a primary uplink frequency, from a serving network node 2, 3 to a UE 1 and/or sending 62 a second HS-SCCH order for TTI switching of a secondary uplink frequency from a secondary serving network node 2, 3 to the UE 1, wherein the TTI HS-SCCH order sent from the secondary serving HS-DSCH node is independent of the TTI switching HS-SCCH order sent from the serving HS-DSCH node.

The communication network may be a Universal Mobile Telecommunications System.

The HS-SCCH order may be sent from a HS-DSCH from either a serving or a secondary HS-DSCH serving node.

The HS-SCCH order may be sent under the extended order type "11 011".

The HS-SCCH order may be sent with a TTI switch order to 2 ms+10 ms, 10 ms+2 ms, 2×2 ms, or 2×10 ms.

The coverage of the communication network may be extended by switching to a longer TTI. The throughput of the communication network may be increased by switching to a shorter TTI.

A method for control of TTI combinations in HSUPA is presented. The method is performed in a UE 1 of a communication network 6 and comprises receiving 63 a single HS-SCCH order for TTI switching of a primary uplink frequency and for TTI switching of a secondary uplink frequency from a serving node 2, 3.

The communication network may be a UMTS.

The HS-SCCH order may be received from a HS-DSCH node.

The HS-SCCH order may be received under the extended order type "11 011".

The HS-SCCH order may be received with a TTI switch order to 2 ms+10 ms, 10 ms+2 ms, 2×2 ms, or 2×10 ms.

The coverage of UMTS may be extended by switching to a longer TTI.

The throughput of the UMTS may be increased by switching to a shorter TTI.

A method for control of TTI combinations in HSUPA is presented. The method is performed in a UE 1 of a Universal Mobile Telecommunications System communication network 6 and comprises receiving 64 a first HS-SCCH order for TTI switching of a primary uplink frequency, from a serving network node 2, 3 and receiving 65 a second HS-SCCH order for TTI switching of a secondary uplink frequency from a secondary serving network node 2, 3, wherein the TTI switching HS-SCCH order sent from a secondary serving HS-DSCH node is independent of the TTI switching HS-SCCH order sent from a serving HS-DSCH node.

A serving node for control of TTI combinations in multicarrier HSUPA is presented. The serving node 2, 3 comprises a processor 10 and a computer program product 12, 13. The computer program product stores instructions that, when executed by the processor, causes the network node to send 60 a single HS-SCCH order for TTI switching of a primary uplink frequency and for TTI switching of a secondary uplink frequency to a UE 1.

A communication network for control of TTI combinations in multicarrier HSUPA is presented. The communication network 6 comprises a processor 10 and a computer program product 12, 13. The computer program product stores instructions that, when executed by the processor, causes the network node to send 61 a first HS-SCCH order for TTI switching of a primary uplink frequency, from a serving network node 2, 3 to a UE 1 and/or to send 62 a second HS-SCCH order for TTI switching of a secondary uplink frequency from a secondary serving network node 2, 3 to the UE 1, wherein the TTI HS-SCCH order sent from the secondary serving HS-DSCH node is independent of the TTI switching HS-SCCH order sent from the serving HS-DSCH node.

A User Equipment for control of TTI combinations in multicarrier HSUPA is presented. The UE 1 comprises a processor 10 and a computer program product 12, 13. The computer program product stores instructions that, when executed by the processor, causes the network node to receive 63 a single HS-SCCH order for TTI switching of a primary uplink frequency and for TTI switching of a secondary uplink frequency from a serving node 2, 3.

A User Equipment for control of TTI combinations in multicarrier HSUPA is presented. The UE 1 comprises a processor 10 and a computer program product 12, 13. The computer program product stores instructions that, when executed by the processor, causes the network node to receive 64 a first HS-SCCH order for TTI switching of a primary uplink frequency, from a serving network node 2, 3 and to receive 65 a second HS-SCCH order for TTI switching of a secondary uplink frequency from a secondary serving network node 2, 3, wherein the TTI switching HS-SCCH order sent from a secondary serving HS-DSCH node is independent of the TTI switching HS-SCCH order sent from a serving HS-DSCH node.

A serving node for control of TTI combinations in multicarrier HSUPA is presented. The serving node 2, 3 comprises a communication manager 70 for sending 60 a single HS-SCCH order for TTI switching of a primary uplink frequency and for TTI switching of a secondary uplink frequency to a UE 1.

A communication network for control of TTI combinations in multicarrier HSUPA is presented. The communication network 6 comprises a communication manager 70 for sending 61 a first HS-SCCH order for TTI switching of a primary uplink frequency, from a serving network node 2, 3 to a UE 1 and/or for sending 62 a second HS-SCCH order for TTI switching of a secondary uplink frequency from a secondary serving network node 2, 3 to the UE 1, wherein the TTI HS-SCCH order sent from the secondary serving HS-DSCH node is independent of the TTI switching HS-SCCH order sent from the serving HS-DSCH node.

A User Equipment for control of TTI combinations in multicarrier HSUPA is presented. The UE 1 comprises a communication manager 70 for receiving 63 a single HS-SCCH order for TTI switching of a primary uplink frequency and for TTI switching of a secondary uplink frequency from a serving node 2, 3.

A User Equipment for control of TTI combinations in multicarrier HSUPA is presented. The UE 1 comprises a communication manager 70 for receiving 64 a first HS-SCCH order for TTI switching of a primary uplink frequency, from a serving network node 2, 3 and for receiving 65 a second HS-SCCH order for TTI switching of a secondary uplink frequency from a secondary serving network node 2, 3, wherein the TTI switching HS-SCCH order sent from a secondary serving HS-DSCH node is independent of the TTI switching HS-SCCH order sent from a serving HS-DSCH node.

A computer program 14, 15 for control of TTI combinations in multicarrier HSUPA is presented. The computer program comprises computer program code which, when run on a serving node 2, 3, causes the serving node 2, 3 to send 60 a single HS-SCCH order for TTI switching of a primary uplink frequency and for TTI switching of a secondary uplink frequency to a UE 1.

A computer program for control of TTI combinations in multicarrier HSUPA is presented. The computer program comprises computer program code which, when run on the communication network 6, causes the communication network 6 to send 61 a first HS-SCCH order for TTI switching of a primary uplink frequency, from a serving network node 2, 3 to a UE 1 and/or to send 62 a second HS-SCCH order for TTI switching of a secondary uplink frequency from a secondary serving network node 2, 3 to the UE 1, wherein the TTI HS-SCCH order sent from the secondary serving HS-DSCH node is independent of the TTI switching HS-SCCH order sent from the serving HS-DSCH node.

A computer program for control of TTI combinations in multicarrier HSUPA is presented. The computer program comprising computer program code which, when run on the UE 1, causes the UE 1 to receive 63 a single HS-SCCH order for TTI switching of a primary uplink frequency and for TTI switching of a secondary uplink frequency from a serving node 2, 3.

A computer program for control of TTI combinations in multicarrier HSUPA is presented. The computer program comprises computer program code which, when run on the UE 1, causes the UE 1 to receive 64 a first HS-SCCH order for TTI switching of a primary uplink frequency, from a serving network node 2, 3 and for receiving 65 a second HS-SCCH order for TTI switching of a secondary uplink frequency from a secondary serving network node 2, 3, wherein the TTI switching HS-SCCH order sent from a secondary serving HS-DSCH node is independent of the TTI switching HS-SCCH order sent from a serving HS-DSCH node.

Figure 5:
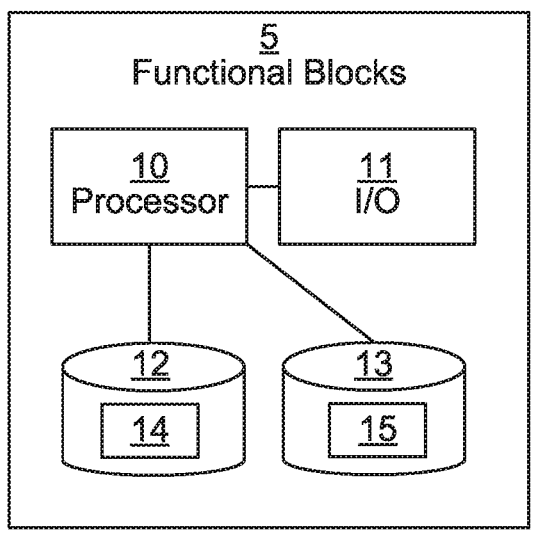
FIG. 5 is a schematic diagram illustrating components of a network device presented herein.
Figure 6A:
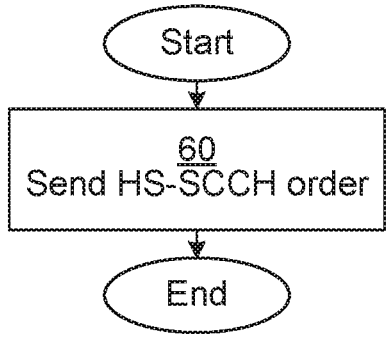
FIG. 6 is a flowchart illustrating methods for embodiments presented herein.
Figure 6B:
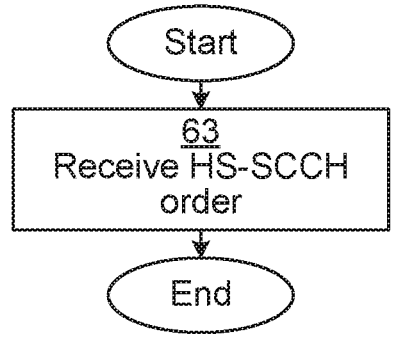
Figure 6C:
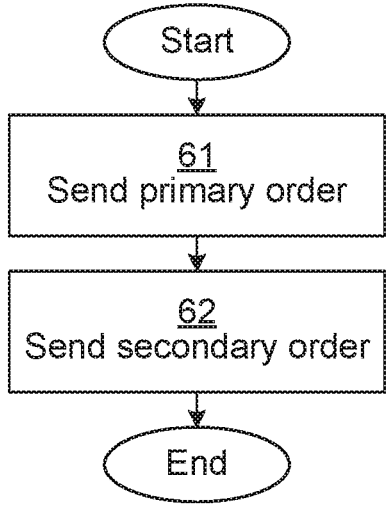
Figure 6D:
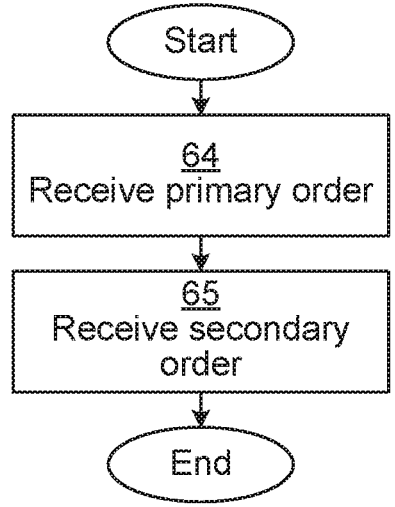

FIG. 5 is a schematic diagram showing some components of the network node 2 or 3 or the user equipment 1, generically numbered 5. A processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIG. 6.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the network node 2 or 3 or the UE 1.

The network node 2 or 3 or the UE 1 may further comprise an input/output, I/O, interface 11 including e.g. a user interface. The network node 2 or 3 or the UE 1 may further comprise a receiver configured to receive signalling from other nodes, and a transmitter configured to transmit signalling to other nodes (not illustrated). Other components of the network node or UE are omitted in order not to obscure the concepts presented herein.

Figure 7:
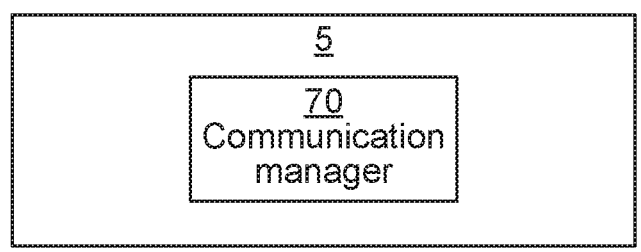
FIG. 7 is a schematic diagram showing functional modules of a network device presented herein.

FIG. 7 is a schematic diagram showing functional blocks of the network node 2 or 3 or the UE 1, generically numbered 5. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 6, comprising a communication manager unit 70. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manger 70 is for control of TTI combinations in HSUPA. This module corresponds to the send step 60 of FIG. 6A, the send steps 61 and 62 of FIG. 6C, the receive steps 63 FIG. 6B and the receive steps 64 and 65 of FIG. 6D. This module can e.g. be implemented by the processor 10 of FIG. 5, when running the computer program.

A computer program product 12, 13 comprising a computer program 14, 15 and a computer readable storage means on which the computer program 14, 15 is stored is presented.

The invention has mainly been described above with reference to a few embodiments. However, as is readily appreciated by a person skilled in the art, other embodiments than the ones disclosed above are equally possible within the scope of the invention, as defined by the appended patent claims.

ITEMIZED LIST OF EMBODIMENTS

1. A method for control of transmission time interval (TTI) combinations in multicarrier High Speed Uplink Packet Access (HSUPA), the method being performed in a serving node (2, 3) of a communication network (6) and comprising:
sending (60) a High Speed Signalling Control Channel (HS-SCCH) order for TTI switching of a primary uplink (UL) frequency and/or for TTI switching of a secondary uplink frequency to a User Equipment (UE 1), wherein the TTI switching HS-SCCH order sent from a secondary serving HS-DSCH node is independent of the TTI switching HS-SCCH order sent from the serving HS-DSCH node.

2. The method according to item 1, wherein a switching order in the form of a particular HS-SCCH order is sent from the serving HS-DSCH node to indicate to the UE to switch the TTI of the primary UL carrier and another switching order may be sent using the HS-SCCH order from the secondary serving HS-DSCH node to indicate a TTI switch for the secondary UL carrier, wherein the HS-SCCH order transmissions may or may not be performed at the same time.

3. A method for control of transmission time interval (TTI) combinations in multicarrier High Speed Uplink Packet Access (HSUPA), the method being performed in a communication network (6) and comprising:
sending (61) a first High Speed Signalling Control Channel (HS-SCCH) order for TTI switching of a primary uplink frequency, from a serving network node (2, 3) to a User Equipment (UE 1); and/or
sending (62) a second HS-SCCH order for TTI switching of a secondary uplink frequency from a secondary serving network node (2, 3) to the UE (1), wherein the TTI HS-SCCH order sent from the secondary serving HS-DSCH node is independent of the TTI switching HS-SCCH order sent from the serving HS-DSCH node.

4. The method according to any one of items 1 to 3, wherein the communication network is a Universal Mobile Telecommunications System (UMTS).

5. The method according to any one of items 1 to 4, wherein the HS-SCCH order is sent from either a serving or a secondary HS-DSCH serving node.

6. The method according to any one of items 1 to 5, wherein the HS-SCCH order is send under the extended order type "11 011".

7. The method according to any one of items 1 to 6, wherein the coverage of the communication network is extended by switching to a longer TTI.

8. The method according to any one of items 1 to 7, wherein the throughput of the communication network is increased by switching to a shorter TTI.

9. A method for control of transmission time interval (TTI) combinations in multicarrier High Speed Uplink Packet Access (HSUPA), the method being performed in a User Equipment (1) of a communication network (6) and comprising:
receiving (63) a High Speed Signalling Control Channel (HS-SCCH) order for TTI switching of a primary uplink frequency and/or for TTI switching of a secondary uplink frequency from a serving node (2, 3), wherein the TTI switching order from a second HS-SCCH order is independent of the TTI switching order of the first HS-SCCH order.

10. A method for control of transmission time interval (TTI) combinations in multicarrier High Speed Uplink Packet Access (HSUPA), the method being performed in a User Equipment (UE 1) of a Universal Mobile Telecommunications System (UMTS 6) and comprising:
receiving (64) a first High Speed Signalling Control Channel (HS-SCCH) order for TTI switching of a primary uplink frequency, from a serving network node (2, 3); and
receiving (65) a second HS-SCCH order for TTI switching of a secondary uplink frequency from a secondary serving network node (2, 3), wherein the TTI switching HS-SCCH order sent from a secondary serving HS-DSCH node is independent of the TTI switching HS-SCCH order sent from a serving HS-DSCH node.

11. The method according to any one of items 9 to 10, wherein the communication network is a Universal Mobile Telecommunications System (UMTS).

12. The method according to any one of items 9 to 11, wherein the HS-SCCH order is received from a High Speed Downlink Shared Channel (HS-DSCH) node.

13. The method according to any one of items 9 to 12, wherein the HS-SCCH order is received under the extended order type "11 011".

14. The method according to any one of items 9 to 13, wherein the coverage of UMTS is extended by switching to a longer TTI.

15. The method according to any one of items 9 to 14, wherein the throughput of the UMTS is increased by switching to a shorter TTI.

16. A serving node for control of transmission time interval (TTI) combinations in multicarrier High Speed Uplink Packet Access (HSUPA), the serving node (2, 3) comprising:
    a processor (10); and
    a computer program product (12, 13) storing instructions that, when executed by the processor, causes the network node to:
        send (60) a High Speed Signalling Control Channel (HS-SCCH) order for TTI switching of a primary uplink (UL) frequency and/or for TTI switching of a secondary uplink frequency to a User Equipment (UE 1), wherein the TTI switching HS-SCCH order sent from a secondary serving HS-DSCH node is independent of the TTI switching HS-SCCH order sent from the serving HS-DSCH node.

17. The serving node according to item 16, wherein a switching order in the form of a particular HS-SCCH order is sent from the serving HS-DSCH node to indicate to the UE to switch the TTI of the primary UL carrier and another switching order may be sent using the HS-SCCH order from the secondary serving HS-DSCH node to indicate a TTI switch for the secondary UL carrier, wherein the HS-SCCH order transmissions may or may not be performed at the same time.

18. A communication network for control of transmission time interval (TTI) combinations in multicarrier High Speed Uplink Packet Access (HSUPA), the communication network (6) comprising:
    a processor (10); and
    a computer program product (12, 13) storing instructions that, when executed by the processor, causes the network node to:
        send (61) a first High Speed Signalling Control Channel (HS-SCCH) order for TTI switching of a primary uplink frequency, from a serving network node (2, 3) to a User Equipment (UE 1); and/or
        send (62) a second HS-SCCH order for TTI switching of a secondary uplink frequency from a secondary serving network node (2, 3) to the UE (1), wherein the TTI HS-SCCH order sent from the secondary serving HS-DSCH node is independent of the TTI switching HS-SCCH order sent from the serving HS-DSCH node.

19. The serving node or network node according to any one of items 16 to 18, wherein the communication network is a Universal Mobile Telecommunications System (UMTS).

20. A User Equipment (UE) for control of transmission time interval (TTI) combinations in multicarrier High Speed Uplink Packet Access (HSUPA), the UE (1) comprising:
    a processor (10); and
    a computer program product (12, 13) storing instructions that, when executed by the processor, causes the network node to:
        receive (63) a High Speed Signalling Control Channel (HS-SCCH) order for TTI switching of a primary uplink frequency and/or for TTI switching of a secondary uplink frequency from a serving node (2, 3), wherein the TTI switching order from an HS-SCCH order is independent of the TTI switching order of the first HS-SCCH order.

21. A User Equipment (UE) for control of transmission time interval (TTI) combinations in multicarrier High Speed Uplink Packet Access (HSUPA), the UE (1) comprising:
    a processor (10); and
    a computer program product (12, 13) storing instructions that, when executed by the processor, causes the network node to:
        receive (64) a first High Speed Signalling Control Channel (HS-SCCH) order for TTI switching of a primary uplink frequency, from a serving network node (2, 3); and
        receive (65) a second HS-SCCH order for TTI switching of a secondary uplink frequency from a secondary serving network node (2, 3), wherein the TTI switching HS-SCCH order sent from a secondary serving HS-DSCH node is independent of the TTI switching HS-SCCH order sent from a serving HS-DSCH node.

22. A serving node for control of transmission time interval (TTI) combinations in multicarrier High Speed Uplink Packet Access (HSUPA), the serving node (2, 3) comprising:
    a communication manager (70) for sending (60) a High Speed Signalling Control Channel (HS-SCCH) order for TTI switching of a primary uplink (UL) frequency and/or for TTI switching of a secondary uplink frequency to a User Equipment (UE 1), wherein the TTI switching HS-SCCH order sent from a secondary serving HS-DSCH node is independent of the TTI switching HS-SCCH order sent from the serving HS-DSCH node.

23. A communication network for control of transmission time interval (TTI) combinations in multicarrier High Speed Uplink Packet Access (HSUPA), the communication network (6) comprising:
    a communication manager (70) for sending (61) a first High Speed Signalling Control Channel (HS-SCCH) order for TTI switching of a primary uplink frequency, from a serving network node (2, 3) to a User Equipment (UE 1); and/or for sending (62) a second HS-SCCH order for TTI switching of a secondary uplink frequency from a secondary serving network node (2, 3) to the UE (1), wherein the TTI HS-SCCH order sent from the secondary serving HS-DSCH node is independent of the TTI switching HS-SCCH order sent from the serving HS-DSCH node.

24. A User Equipment (UE) for control of transmission time interval (TTI) combinations in multicarrier High Speed Uplink Packet Access (HSUPA), the UE (1) comprising:
    a communication manager (70) for receiving (63) a High Speed Signalling Control Channel (HS-SCCH) order for TTI switching of a primary uplink frequency and/or for TTI switching of a secondary uplink frequency from a serving node (2, 3), wherein the TTI switching order from an HS-SCCH order is independent of the TTI switching order of the first HS-SCCH order.

25. A User Equipment (UE) for control of transmission time interval (TTI) combinations in multicarrier High Speed Uplink Packet Access (HSUPA), the UE (1) comprising:
    a communication manager (70) for receiving (64) a first High Speed Signalling Control Channel (HS-SCCH) order for TTI switching of a primary uplink frequency, from a serving network node (2, 3); and for receiving (65) a second HS-SCCH order for TTI switching of a secondary uplink frequency from a secondary serving network node (2, 3), wherein the TTI switching HS-SCCH order sent from a secondary serving HS-DSCH node is independent of the TTI switching HS-SCCH order sent from a serving HS-DSCH node.

26. A computer program (14, 15) for control of transmission time interval (TTI) combinations in multicarrier High Speed Uplink Packet Access (HSUPA), the computer program comprising computer program code which, when run on a serving node (2, 3), causes the serving node (2, 3) to:

send (60) a High Speed Signalling Control Channel (HS-SCCH) order for TTI switching of a primary uplink (UL) frequency and/or for TTI switching of a secondary uplink frequency to a User Equipment (UE 1), wherein the TTI switching HS-SCCH order sent from a secondary serving HS-DSCH node is independent of the TTI switching HS-SCCH order sent from the serving HS-DSCH node.

27. A computer program for control of transmission time interval (TTI) combinations in multicarrier High Speed Uplink Packet Access (HSUPA), the computer program comprising computer program code which, when run on the communication network (6), causes the communication network (6) to:

send (61) a first High Speed Signalling Control Channel (HS-SCCH) order for TTI switching of a primary uplink frequency, from a serving network node (2, 3) to a User Equipment (UE 1); and/or send (62) a second hS-SCCH order for TTI switching of a secondary uplink frequency from a secondary serving network node (2, 3) to the UE (1), wherein the TTI HS-SCCH order sent from the secondary serving HS-DSCH node is independent of the TTI switching HS-SCCH order sent from the serving HS-DSCH node.

28. A computer program for control of transmission time interval (TTI) combinations in multicarrier High Speed Uplink Packet Access (HSUPA), the computer program comprising computer program code which, when run on the UE (1), causes the UE (1) to:

receive (63) a High Speed Signalling Control Channel (HS-SCCH) order for TTI switching of a primary uplink frequency and/or for TTI switching of a secondary uplink frequency from a serving node (2, 3), wherein the TTI switching order from a second HS-SCCH order is independent of the TTI switching order of the first HS-SCCH order.

29. A computer program for control of transmission time interval (TTI) combinations in multicarrier High Speed Uplink Packet Access (HSUPA), the computer program comprising computer program code which, when run on the UE (1), causes the UE (1) to:

receive (64) a first High Speed Signalling Control Channel (HS-SCCH) order for TTI switching of a primary uplink frequency, from a serving network node (2, 3); and for receiving (65) a second HS-SCCH order for TTI switching of a secondary uplink frequency from a secondary serving network node (2, 3), wherein the TTI switching HS-SCCH order sent from a secondary serving HS-DSCH node is independent of the TTI switching HS-SCCH order sent from a serving HS-DSCH node.

The invention claimed is:

1. A method for control of transmission time interval (TTI) combinations in multicarrier High Speed Uplink Packet Access (HSUPA), the method being performed in a serving node of a communication network and comprising:

sending a single High Speed Signalling Control Channel (HS-SCCH) order for TTI switching of a primary uplink (UL) frequency and for TTI switching of a secondary uplink frequency to a User Equipment, where the HS-SCCH order is sent indicating a TTI switch order to one of the group consisting of:
2 ms+10 ms;
10 ms+2 ms;
2×2 ms; and
2×10 ms.

2. The method according to claim 1, wherein the communication network is a Universal Mobile Telecommunications System (UMTS).

3. The method according to claim 1, wherein the HS-SCCH order is sent under the extended order type "11 011".

4. The method according to claim 1, wherein the HS-SCCH order is sent indicating the TTI switch order from 2×2 ms to 2×10 ms, from 2×10 ms to 2×2 ms, from 2×2 ms to 10 ms+2 ms, from 10 ms+2 ms to 2×2 ms, from 2×10 ms to 10 ms+2 ms, from 10 ms+2 ms to 2×10 ms, from 2×2 ms to 2 ms+10 ms, from 2 ms+10 ms to 2×2 ms, from 2 ms+10 ms to 2×10 ms, or from 2×10 ms to 2 ms+10 ms.

5. The method according to claim 1, wherein the coverage of the communication network is extended by switching to a longer TTI.

6. The method according to claim 1, wherein the throughput of the communication network is increased by switching to a shorter TTI.

7. A method for control of transmission time interval (TTI) combinations in multicarrier High Speed Uplink Packet Access (HSUPA), the method being performed in a User Equipment of a communication network and comprising:

receiving a single High Speed Signalling Control Channel (HS-SCCH) order for TTI switching of a primary uplink frequency and for TTI switching of a secondary uplink frequency from a serving node, where the HS-SCCH order is sent indicating a TTI switch order to one of the group consisting of:
2 ms+10 ms;
10 ms+2 ms;
2×2 ms; and
2×10 ms.

8. The method according to claim 7, wherein the communication network is a Universal Mobile Telecommunications System (UMTS).

9. The method according to claim 7, wherein the HS-SCCH order is received from a High Speed Downlink Shared Channel (HS-DSCH) node.

10. The method according to claim 7, wherein the HS-SCCH order is received under the extended order type "11 011".

11. The method according to claim 7, wherein the HS-SCCH order is sent indicating the TTI switch order from 2×2 ms to 2×10 ms, from 2×10 ms to 2×2 ms, from 2×2 ms to 10 ms+2 ms, from 10 ms+2 ms to 2×2 ms, from 2×10 ms to 10 ms+2 ms, from 10 ms+2 ms to 2×10 ms, from 2×2 ms to 2 ms+10 ms, from 2 ms+10 ms to 2×2 ms, from 2 ms+10 ms to 2×10 ms, or from 2×10 ms to 2 ms+10 ms.

12. The method according to claim 7, wherein the coverage of Universal Mobile Telecommunications System UMTS is extended by switching to a longer TTI.

13. The method according to claim 7, wherein the throughput of the UMTS is increased by switching to a shorter TTI.

14. A serving node for control of transmission time interval (TTI) combinations in multicarrier High Speed Uplink Packet Access (HSUPA), the serving node comprising:

a processor; and
a computer program product storing instructions that, when executed by the processor, causes the network node to:
send a single High Speed Signalling Control Channel (HS-SCCH) order for TTI switching of a primary uplink (UL) frequency and for TTI switching of a secondary uplink frequency to a User Equipment, where the HS-SCCH order is sent indicating a TTI switch order to one of the group consisting of:
2 ms+10 ms;
10 ms+2 ms;
2×2 ms; and
2×10 ms.

15. The serving node according to claim 14, wherein the communication network is a Universal Mobile Telecommunications System (UMTS).

16. A User Equipment (UE) for control of transmission time interval (TTI) combinations in multicarrier High Speed Uplink Packet Access (HSUPA), the UE comprising:
a processor; and
a computer program product storing instructions that, when executed by the processor, causes the network node to:
receive a single High Speed Signalling Control Channel (HS-SCCH) order for TTI switching of a primary uplink frequency and for TTI switching of a secondary uplink frequency from a serving node, where the HS-SCCH order is sent indicating a TTI switch order to one of the group consisting of:
2 ms+10 ms;
10 ms+2 ms;
2×2 ms; and
2×10 ms.

17. A computer program for control of transmission time interval (TTI) combinations in multicarrier High Speed Uplink Packet Access (HSUPA) stored on a non-transitory computer readable storage, the computer program comprising computer program code which, when run on a serving node, causes the serving node to:
send a single High Speed Signalling Control Channel (HS-SCCH) order for TTI switching of a primary uplink (UL) frequency and for TTI switching of a secondary uplink frequency to a User Equipment, where the HS-SCCH order is sent indicating a TTI switch order to one of the group consisting of:
2 ms+10 ms;
10 ms+2 ms;
2×2 ms; and
2×10 ms.

18. A computer program for control of transmission time interval (TTI) combinations in multicarrier High Speed Uplink Packet Access (HSUPA) stored on a non-transitory computer readable storage, the computer program comprising computer program code which, when run on the UE, causes the UE to:
receive a single High Speed Signalling Control Channel (HS-SCCH) order for TTI switching of a primary uplink frequency and for TTI switching of a secondary uplink frequency from a serving node, where the HS-SCCH order is sent indicating a TTI switch order to one of the group consisting of:
2 ms+10 ms;
10 ms+2 ms;
2×2 ms; and
2×10 ms.

* * * * *